(12) United States Patent
Chen

(10) Patent No.: US 11,644,694 B2
(45) Date of Patent: May 9, 2023

(54) DISASSEMBLY AND ASSEMBLY STRUCTURE OF GLASSES SIDE COVER

(71) Applicant: ARGUS VISION INTERNATIONAL LIMITED, Tainan (TW)

(72) Inventor: Lin Yun Chen, Tainan (TW)

(73) Assignee: ARGUS VISION INTERNATIONAL LIMITED, Tainan (TW)

( * ) Notice: Subject to any disclaimer, the term of this patent is extended or adjusted under 35 U.S.C. 154(b) by 240 days.

(21) Appl. No.: 17/035,712

(22) Filed: Sep. 29, 2020

(65) Prior Publication Data

US 2021/0263344 A1 Aug. 26, 2021

(30) Foreign Application Priority Data

Feb. 20, 2020 (TW) ................................. 109105516

(51) Int. Cl.
*G02C 11/00* (2006.01)
(52) U.S. Cl.
CPC .......... *G02C 11/12* (2013.01); *G02C 2200/20* (2013.01)
(58) Field of Classification Search
CPC ..................................................... G02C 11/12
See application file for complete search history.

(56) References Cited

U.S. PATENT DOCUMENTS

| | | | | |
|---|---|---|---|---|
| 4,544,245 A * | 10/1985 | Stansbury, Jr. | ...... | G02C 5/2263 351/86 |
| 5,007,728 A * | 4/1991 | Magorien | ............. | G02C 5/146 351/119 |
| 5,652,637 A * | 7/1997 | Marini | ................... | G02C 5/146 351/116 |
| 7,163,288 B1 * | 1/2007 | Jung | ...................... | G02C 11/12 351/44 |
| 8,087,774 B2 * | 1/2012 | Yang | ........................ | G02C 7/16 351/44 |
| 8,393,731 B2 * | 3/2013 | Jung | ...................... | G02C 11/12 351/44 |

(Continued)

FOREIGN PATENT DOCUMENTS

| KR | 200186365 Y1 * | 6/2000 |
|---|---|---|
| KR | 200350660 Y1 * | 5/2004 |

*Primary Examiner* — Christopher Stanford
(74) *Attorney, Agent, or Firm* — Bruce Stone LLP; Joseph A. Bruce

(57) ABSTRACT

Provided is a disassembly and assembly structure of a glasses side cover, including a pair of glasses and at least one side cover. The glasses have a frame and two temples. At least one temple is provided with a chute with an opening adjacent to the pivot portion. The chute forms a first end and a second end along the length direction, and an end of the opening adjacent to the first end is provided with a resisting portion. The at least one side cover has a guide seat and a first plate arranged below the guide seat. The guide seat detachably straddles an outer edge of the opening, and is provided with an operating member received in the chute. The front end of the operating member is provided with a positioning block. When the operating member slides to the first end, the positioning block is embedded between the first end and the resisting portion to be fixed according to the elasticity of the material. When the operating member is pressed, the positioning block is detached from the fixation and slid to the second end such that the side cover can be detached from the temple.

7 Claims, 8 Drawing Sheets

(56) References Cited

U.S. PATENT DOCUMENTS

| | | | | |
|---|---|---|---|---|
| 8,641,189 B2* | 2/2014 | LaGace | .................. | G02C 11/12 |
| | | | | 351/44 |
| 8,793,817 B2* | 8/2014 | Hou | ....................... | G02C 11/12 |
| | | | | 2/449 |
| 9,201,251 B2* | 12/2015 | Sadler | .................... | G02C 11/12 |
| 9,568,747 B2* | 2/2017 | Kim | ....................... | G02C 11/12 |
| 10,365,505 B2* | 7/2019 | Chen | ....................... | G02C 11/12 |
| 11,048,104 B2* | 6/2021 | Chen | ....................... | G02C 5/146 |
| 2006/0268217 A1* | 11/2006 | Teng | ....................... | G02C 11/12 |
| | | | | 351/41 |
| 2017/0075134 A1* | 3/2017 | Chen | ....................... | G02C 5/146 |
| 2017/0315385 A1* | 11/2017 | Chung | ................ | F21V 21/0885 |
| 2019/0235272 A1* | 8/2019 | Otra | ....................... | G02C 5/146 |
| 2019/0265516 A1* | 8/2019 | Chou | ....................... | G02C 5/146 |
| 2020/0301167 A1* | 9/2020 | Chen | ....................... | G02C 11/12 |

* cited by examiner

A-A

B-B

DISASSEMBLY AND ASSEMBLY STRUCTURE OF GLASSES SIDE COVER

BACKGROUND OF THE INVENTION

1. Field of the Invention

The present disclosure relates to a structure for disassembling and assembling a side cover of glasses, and more particularly to a side cover structure that can be easily assembled or detached to a temple.

2. The Prior Arts

Generally, workers engaged in special activities protect the eyes from splashing foreign objects (such as chemicals and particles) from entering the eyes and thereby causing damage. Hence, they would wear protective glasses during operation. However, most of the protective glasses for industrial use are made of integral plastic, without optical power, and the temples cannot be bent, thereby making storage difficult.

As such, there is another kind of optical glasses with a structure for installing the protective side cover on the temple such that the vision corrector can assemble or detach the side cover from the temple with the aid of screws and tools depending on the situation. However, although such structure is better than the above-mentioned integrally formed protective glasses, each time the side cover is disassembled and assembled; the operation is relatively cumbersome, resulting in inconvenience in use. Therefore, the prior art technology is still not perfect.

SUMMARY OF THE INVENTION

In view of the shortcomings of the above-mentioned prior art technology, an objective of the present disclosure is to solve the problem of cumbersome operation of assembling or detaching the side cover of the glasses from the temples, thereby causing inconvenience.

In an embodiment of the present disclosure, a disassembly and assembly structure of a glasses side cover of the present disclosure mainly includes a pair of glasses and at least one side cover.

The pair of glasses includes a frame and two temples. Two ends of each temple along a length direction respectively form a pivot portion and a temple end. The pivot portion is pivoted on both sides of the frame. At least one temple is provided with a chute with an opening adjacent to the pivot portion. The chute forms a first end and a second end along the length direction, and an end of the opening adjacent to the first end is provided with a resisting portion The at least one side cover includes a guide seat and a first plate arranged below the guide seat. The guide seat detachably straddles an outer edge of the opening, and is provided with an operating member received in the chute, the operating member operably moves along the chute between the first end and the second en. A front end of the operating member is provided with a positioning block facing the opening, and a gap is formed between the front end and the first end of the chute As such, according to the embodiment of the present disclosure, when the operating member is at the first end, the positioning block is embedded between the first end and the resisting portion according to elasticity of a material such that at least one side cover is fixed to the at least one temple; when the operating member is pressed to move the front end of the opening member toward the gap, the positioning block is moved away from between the first end and the resisting portion, and is simultaneously moved toward the second end such that the at least one side cover is detached from the at least one temple. Therefore, the at least one side cover can be easily assembled or detached on the temple.

DETAILED DESCRIPTION OF THE PREFERRED EMBODIMENT

The detailed description of the present invention is provided in combination with the accompanying drawings.

Please refer to FIGS. 1-5. According to a preferred embodiment of the present disclosure, a disassembly and assembly structure of a glasses side cover mainly includes glasses 1 and at least one side cover 4.

Figure 1:
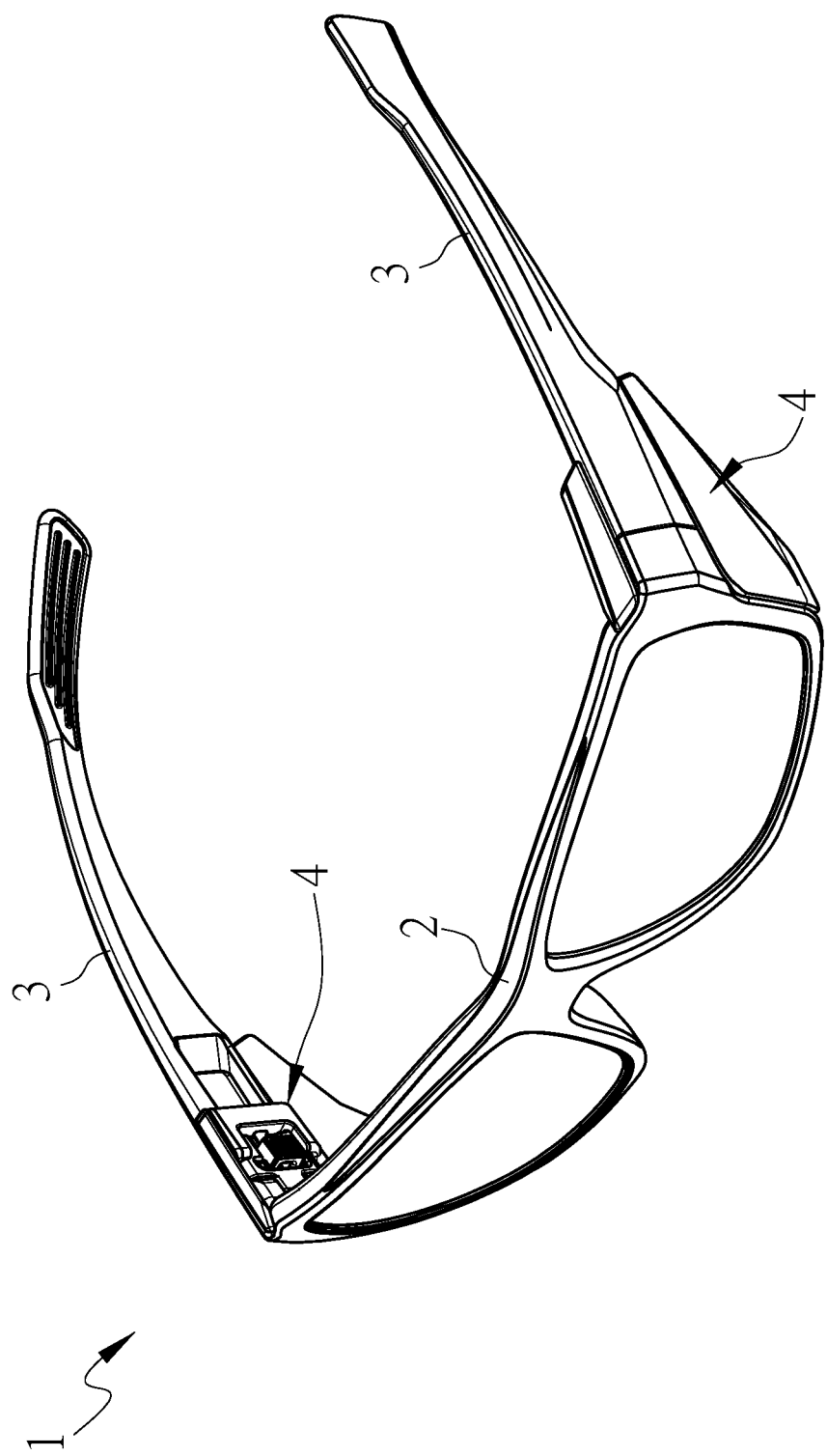
FIG. 1 is a three-dimensional schematic diagram of the present disclosure.
Figure 2:
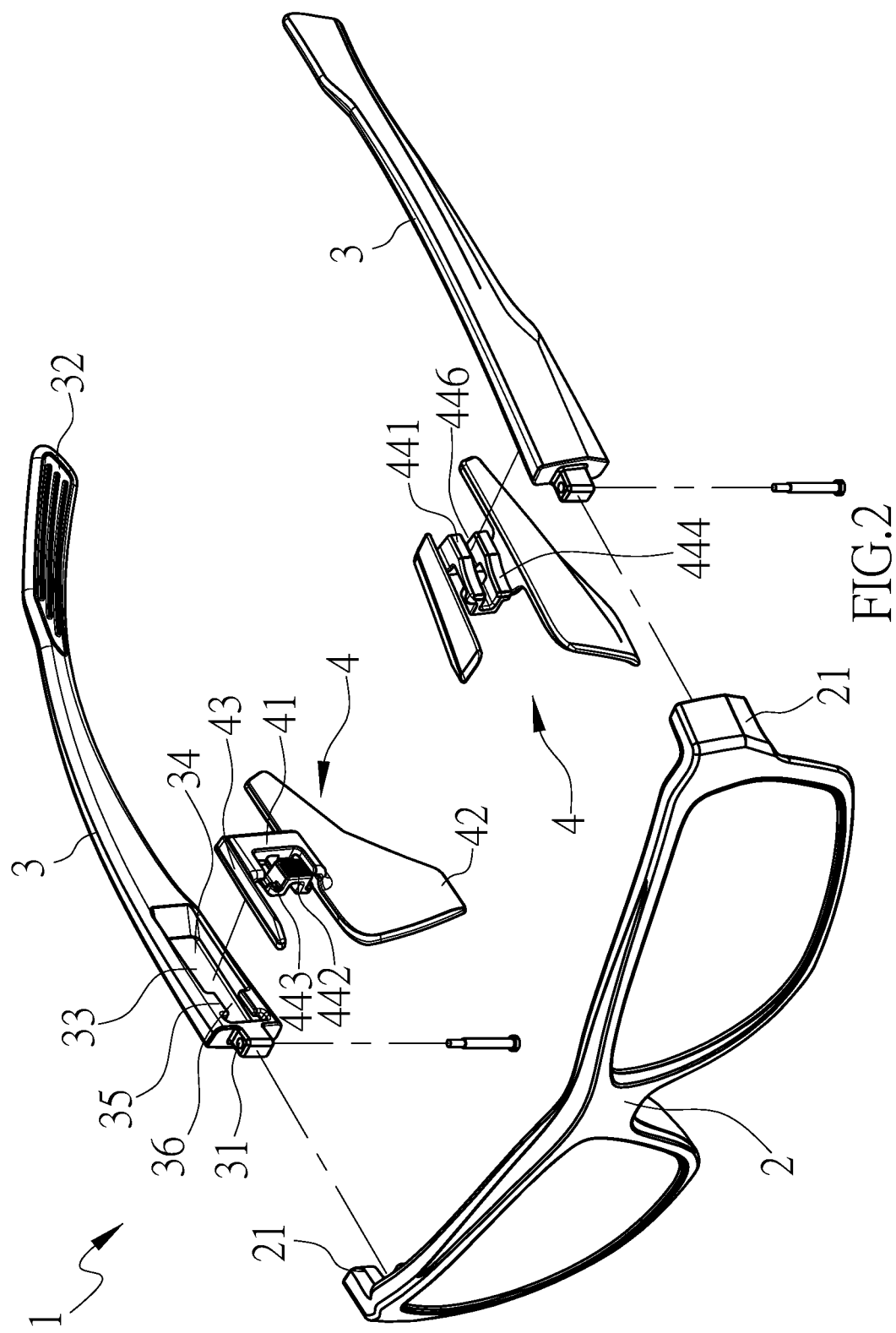
FIG. 2 is an exploded three-dimensional schematic diagram of the present disclosure.
Figure 3:
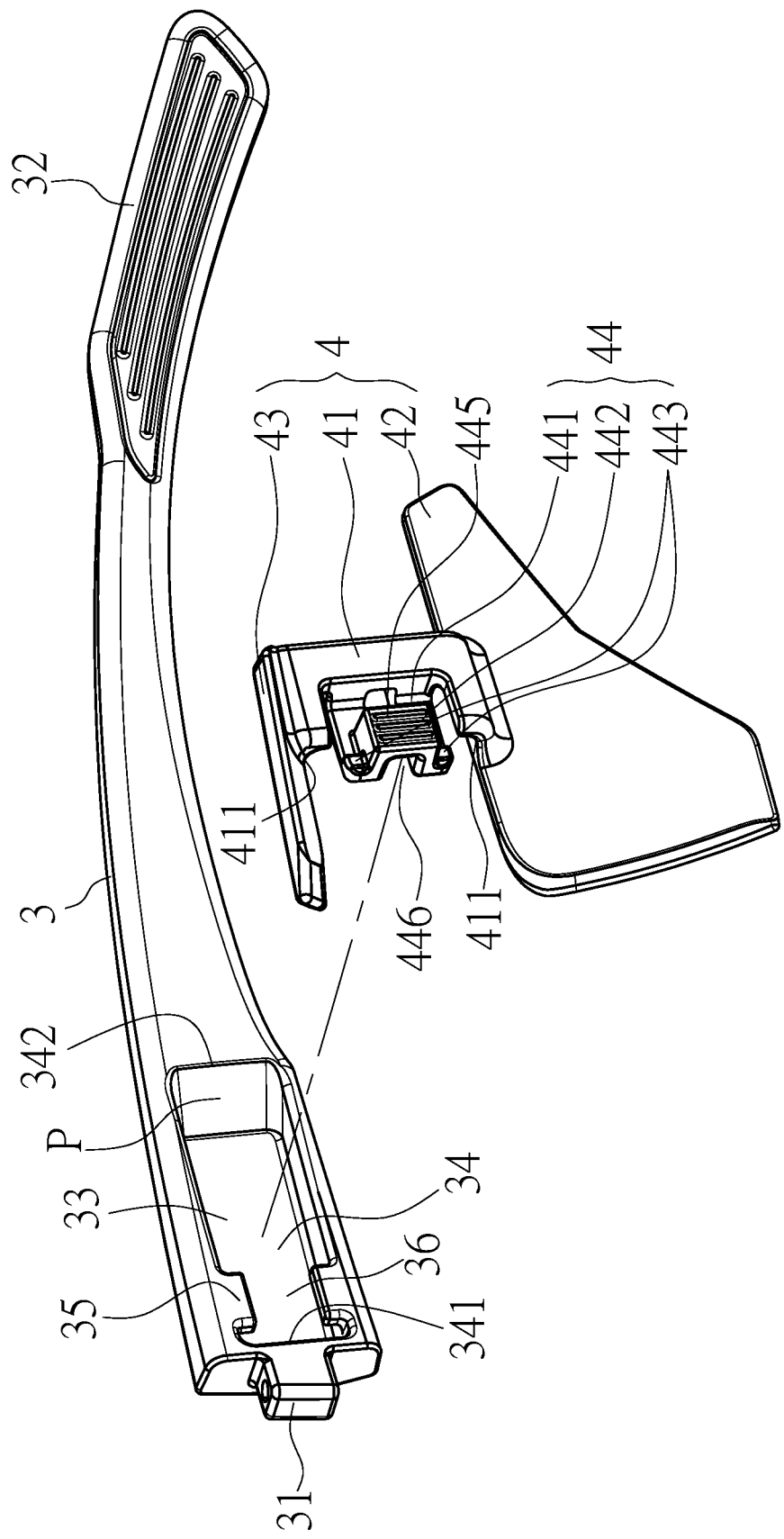
FIG. 3 is an exploded three-dimensional schematic diagram of a temple and a side cover according to the embodiment of the present disclosure.
Figure 4:
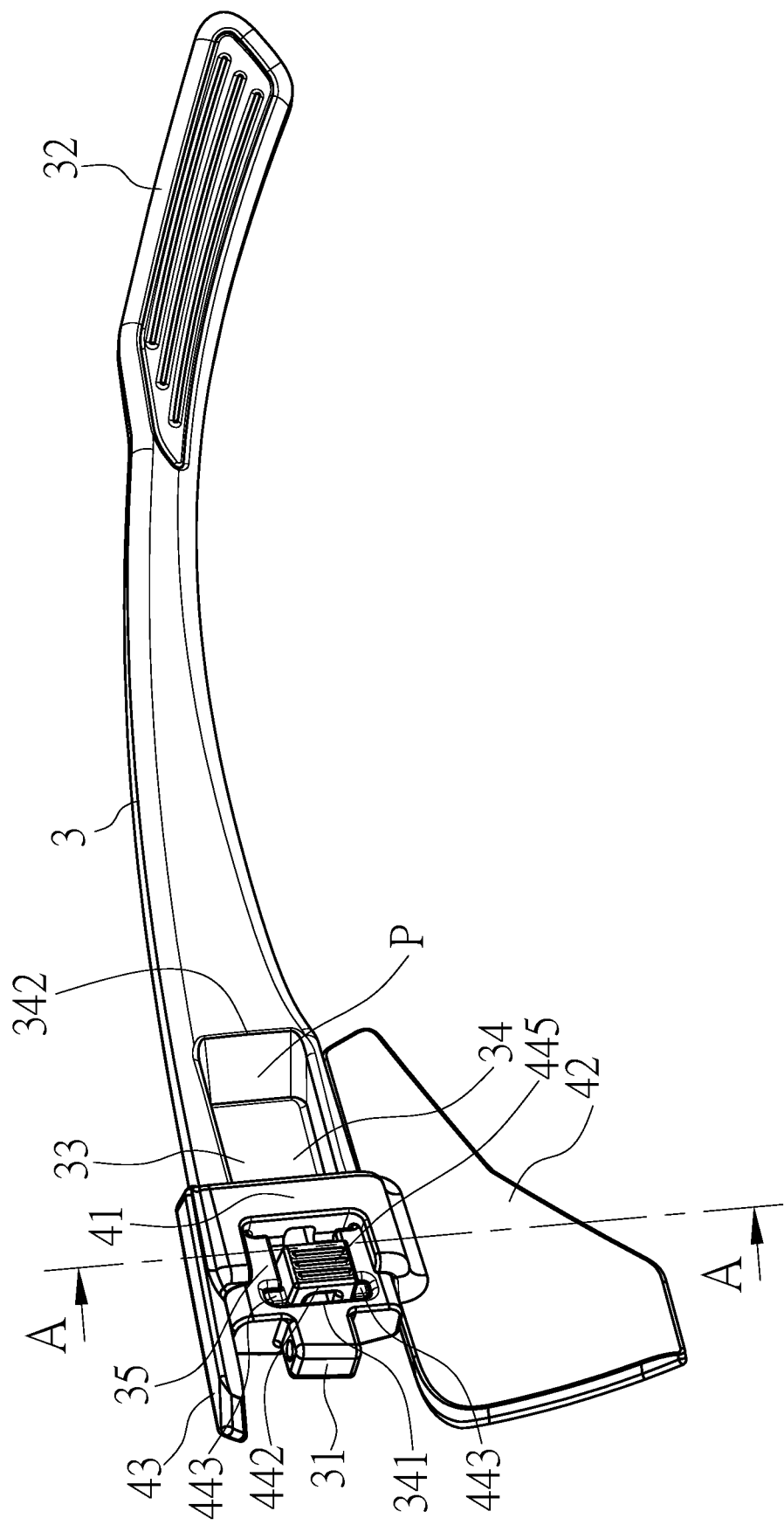
FIG. 4 is a three-dimensional schematic diagram showing the combination of the temple and the side cover according to the embodiment of the present disclosure.
Figure 5:
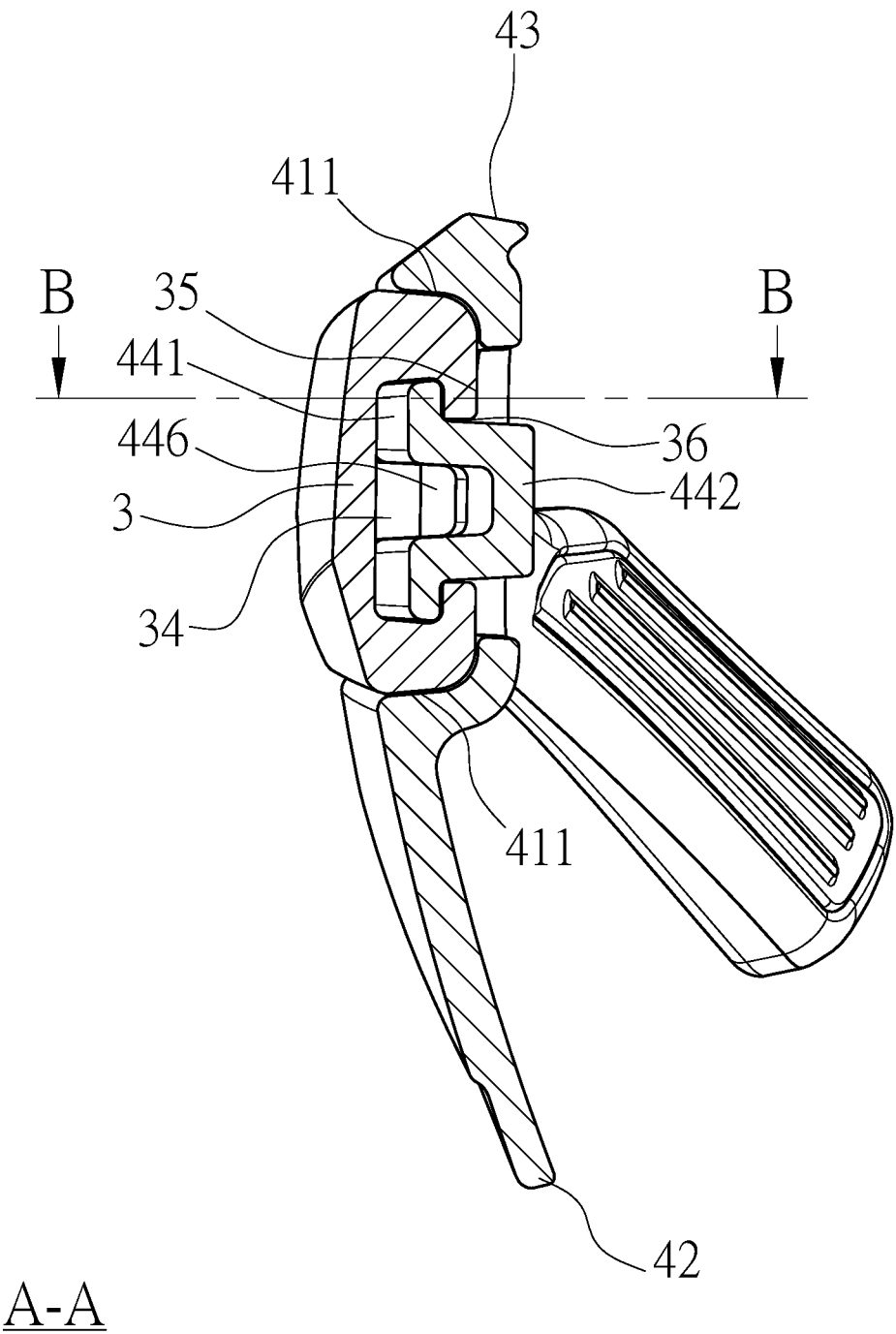
FIG. 5 is a three-dimensional cross-sectional schematic diagram taken along the line A-A in FIG. 4 according to the embodiment of the present disclosure.

The glasses 1 have a frame 2 and two temples 3. Two ends of each temple 3 along a length direction respectively form a pivot portion 31 and a temple end 32. The sides of the frame 2, the temples 3 and at least one side cover 4 facing the wearer's face are the inner side, and the sides thereof facing the outside are the outer side. The pivot base 21 is provided on each side of the frame 2. The pivot portion 31 of the temple 3 is pivoted on the pivot base 21. At least one of the temples 3 adjacent to the pivot portion 31 is provided with a chute 34 having an opening 33. FIGS. 1 and 2 show two temples 3 having chutes 34 together with two side covers 4. In the embodiment, the opening 33 is arranged on the inner side of the at least one temple 3, but not limited thereto. The opening 33 can also be provided on the outer side of the at least one temple 3. As shown in FIG. 3, the chute 34 forms a first end 341 and a second end 342 along the length direction, and a resisting portion 35 is connected to the upper and lower ends of the opening 33 adjacent to the first end 341. A passage 36 is provided in the middle section of the resisting portion 35.

The at least one side cover 4 has a guide seat 41, a first plate 42 arranged below the guide seat 41 and a second plate 43 arranged above the guide seat 41. The present disclosure does not limit the manner in which the first plate 42 and the second plate 43 are arranged on the guide seat 41. The first plate 42 and the second plate 43 can be integrally extended, screwed, embedded, etc. The drawings are based on the integral extension of the guide seat 41 as an example.

The guide seat 41 is detachably arranged on the at least one temples 3. In the embodiment, the guide seat 41 is n-shaped. The guide seat 41 is arranged on one side of the at least one temples 3, and straddles an outer edge of the opening 33. The top and bottom of the guide seat 41 are respectively provided with an extension portion 411 overlapping the top and bottom of the at least one temples 3. The first plate 42 is connected with the extension portion 411 at the bottom of the guide seat 41, and the second plate 43 is connected with the extension portion 411 at the top of the guide seat 41.

The guide seat 41 is further provided with an operating member 44. The operating member 44 has a cantilever 441 arranged along the length direction of the temple 3. The cantilever 441 is accommodated in the chute 34. The rear end of the cantilever 441 is provided on the guide seat 41, and the front end of the cantilever 441 is extended toward the first end 341 of the chute 34. A push button 442 is provided at the front end of the cantilever 441. The side of the cantilever 441 facing the opening 33 is provided with a positioning block 443. The positioning block 443 in the drawings of the present disclosure is formed as two convex parts, which are respectively arranged on both sides of the push button 442 and at the front end of the cantilever 441, but not limited thereto. The positioning block 442 may also be a single convex part. In addition, the outer side of the front end of the cantilever 441 of the at least one side cover 4 forms an arc surface 444 opposite to the bottom of the chute 34. A gap H1 is formed between the arc surface and the bottom of the chute 34. The gap H1 is the elastic compression space of the cantilever 441. In the embodiment, The push button 442 is integrally extended from the cantilever 441, and the cantilever 441 is integrally extended from the guide seat 41.

Figure 6:
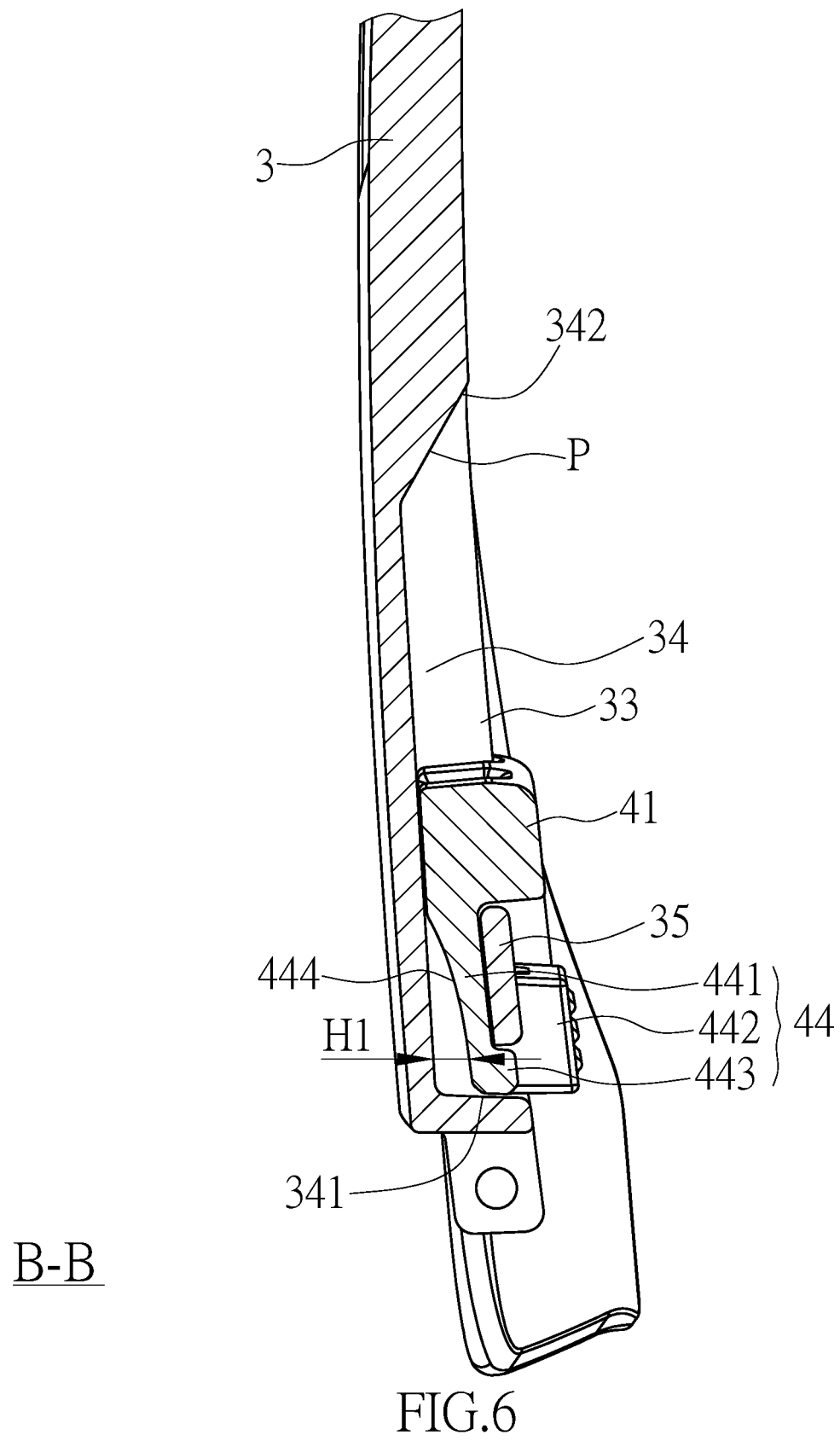
FIG. 6 is a three-dimensional cross-sectional schematic diagram taken along the line B-B in FIG. 5 according to the embodiment of the present disclosure.
Figure 7:
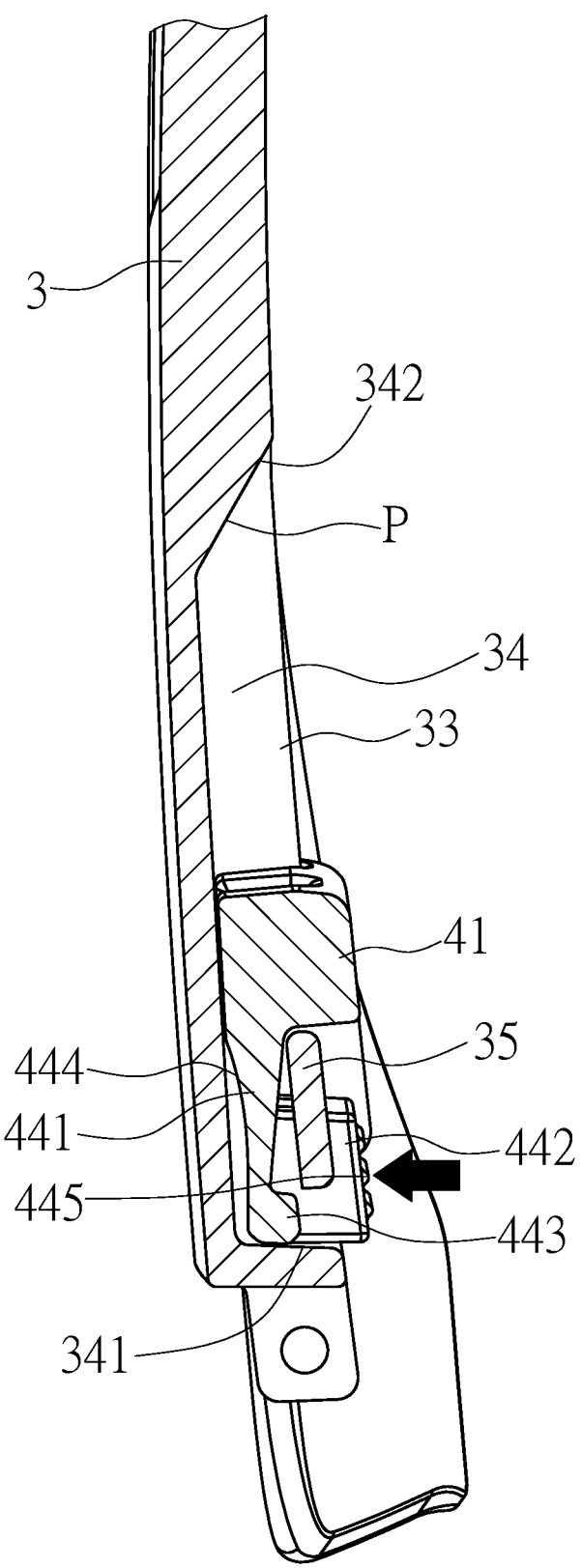
FIGS. 7 and 8 are schematic diagrams of the continuous operation of the present disclosure.
Figure 8:
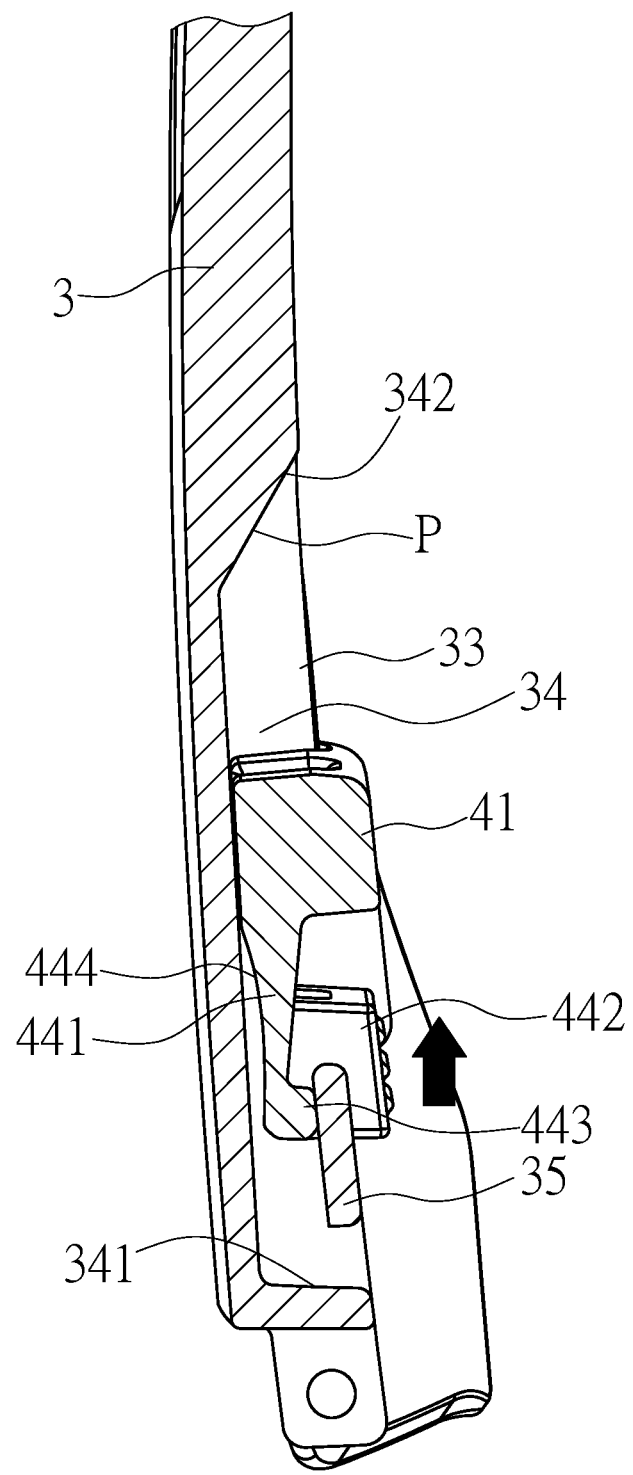

As shown in FIGS. 6 to 8, when the wearer need to use the at least one side cover 4, it is only necessary to install the guide seat 41 of the side cover 4 on the second end 342 of the chute 34 on the at least one temple 3 such that the operating member 44 is accommodated in the chute 34. Since the push button 442 on the cantilever 441 is pressed, the outer side of the cantilever 441 is close to the bottom of the chute 34, and the push button 442 is pushed to slide toward the first end 341 of the chute 34 at the same time. Pressing the push button 442 is mainly to allow the positioning block 443 to pass by the resisting portion 35 toward the side of the chute 34. After the front end of the cantilever 441 is pressed against the first end 341 of the chute 34, the push button 442 is released to make it elastically reset according to its material. Accordingly, the positioning block 443 is embedded between the first end 341 and the resisting portion 35, and the push button 442 is penetrated in the passage 36 to form a restriction. The at least one side cover 4 is fixed on the at least one temple 3. One side of the first plate 42 will overlap the outer side of the temple 2 such that the first plate 42 is entirely shielded on the outer side of the temple 2 and under the at least one temple 3. The second plate 43 is entirely overlapped on the top of the at least one temple 3 and on the top of the frame 2 so as to achieve the protective effect of the upper and side of the glasses 1.

Conversely, when the wearer wants to remove the at least one side cover 4, it is only necessary to press the push button 442 to allow the positioning block 443 to detach from the first end 341 and the resisting portion 35. At the same time, the push button 442 is displaced along the chute 34 to the second end 341 such that the cantilever 441 as a whole is not blocked by the resisting portion 35. As a result, the at least one side cover 4 can be detached from the at least one temple 3.

It is worth mentioning that one side of the push button 442 is provided with a plurality of anti-slip ribs 445. When the wearer presses the push button 442, the push button 442 has an anti-slip effect. The cantilever 441 is provided with a groove on the side facing the bottom of the chute 34, whereby the groove 446 makes the cantilever 441 easier to press and has a better hand feeling. In order for the at least one side cover 4 to be smoothly operated when installed or detached from the chute 34, the wall of the chute 34 located at the second end 342 forms an inclined plane P from the edge of the opening 33 to the bottom of the chute 34. As such, whether the operating member 44 of the least one side cover 4 enters the chute 34 from the second end 342, or the operating member 44 slides from the first end 341 to the second end 342 and is taken out, both can move along the inclined plane P to achieve smooth installation and removal.

In summary, when the at least one side cover 4 of the present disclosure is installed on the at least one temple 3, or the at least one side cover 4 is detached from the at least one temple 3, the at least one side cover 4 can be easily assembled or detached from the at least one temple 3, thereby achieving the purpose of convenience.

Although the present disclosure has been described with reference to the preferred exemplary embodiments thereof, it is apparent to those skilled in the art that a variety of modifications and changes may be made without departing from the scope of the present disclosure which is intended to be defined by the appended claims.

What is claimed is:

1. A disassembly and assembly structure of a glasses side cover, comprising:
   glasses, having a frame and two temples, wherein two ends of each temple along a length direction respectively form a pivot portion and a temple end, the pivot portion is pivoted on both sides of the frame, at least one temple is provided with a chute with an opening adjacent to the pivot portion, the chute forms a first end and a second end along the length direction, and an end of the opening adjacent to the first end is provided with a resisting portion; and
   at least one side cover, having a guide seat and a first plate arranged below the guide seat, wherein the guide seat detachably straddles an outer edge of the opening, and is provided with an operating member received in the chute, the operating member operably moves along the chute between the first end and the second end, a front end of the operating member is provided with a positioning block facing the opening, and a gap is formed between the front end and the first end of the chute,
   wherein when the operating member is at the first end, the positioning block is embedded between the first end and the resisting portion according to elasticity of a material such that at least one side cover is fixed to the at least one temple; when the operating member is pressed to move the front end of the opening member toward the gap, the positioning block is moved away from between the first end and the resisting portion, and is simultaneously moved toward the second end such that the at least one side cover is detached from the at least one temple,
   wherein the resisting portion is provided with a passage, the operating member of the side cover has a cantilever, which is accommodated in the chute, one end of the cantilever is provided on the guide seat, the other end of the cantilever is provided with a push button, the positioning block is arranged on the cantilever and is a convex part on both sides of the push button, when the operating member is at the first end, the push button is inserted through the passage, and when the operating member is at the second end, the push button is separated from the passage, and wherein a plurality of anti-slip ribs is provided on one side of the push button.

2. The disassembly and assembly structure of a glasses side cover of claim 1, wherein the opening is provided on one of the inside or outside of the at least one temple.

3. The disassembly and assembly structure of a glasses side cover of claim 1, wherein a wall surface of the chute at the second end forms an inclined plane from the edge of the opening to a bottom of the chute.

4. The disassembly and assembly structure of a glasses side cover of claim 1, wherein when the operating member of the at least one side cover is at the first end, one side of the first plate overlaps an outer side of the frame.

5. The disassembly and assembly structure of a glasses side cover of claim 1, wherein a second plate is further arranged above the guide seat, and is overlapped on a top of the at least one temple and on a top of the frame.

6. The disassembly and assembly structure of a glasses side cover of claim 1, wherein an outer side of the front end of the operating member of the at least one side cover forms an arc surface opposite to a bottom of the chute.

7. The disassembly and assembly structure of a glasses side cover of claim 1, wherein the guide seat is n-shaped, and a top and a bottom of the guide seat are respectively provided with an extension portion to overlap a top and a bottom of the at least one temple.

* * * * *